(12) United States Patent
Hirschauer

(10) Patent No.: US 11,072,128 B2
(45) Date of Patent: Jul. 27, 2021

(54) METHOD FOR PRODUCING UNITS WITH AXIALLY MOVABLE COMPONENTS

(71) Applicants: thyssenkrupp Presta AG, Eschen (LI); thyssenkrupp AG, Essen (DE)

(72) Inventor: Peter Hirschauer, Feldkirch (AT)

(73) Assignees: thyssenkrnpp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 16/650,163

(22) PCT Filed: Oct. 5, 2018

(86) PCT No.: PCT/EP2018/077099
§ 371 (c)(1),
(2) Date: Mar. 24, 2020

(87) PCT Pub. No.: WO2019/072702
PCT Pub. Date: Apr. 18, 2019

(65) Prior Publication Data
US 2020/0230890 A1 Jul. 23, 2020

(30) Foreign Application Priority Data

Oct. 12, 2017 (DE) ..................... 10 2017 123 770.4

(51) Int. Cl.
*B32B 37/00* (2006.01)
*B29C 65/08* (2006.01)
(Continued)

(52) U.S. Cl.
CPC ........ *B29C 65/088* (2013.01); *B29C 66/9512* (2013.01); *B29C 66/9513* (2013.01); *B62D 1/185* (2013.01); *B29L 2023/22* (2013.01)

(58) Field of Classification Search
USPC ....................................................... 156/73.1
See application file for complete search history.

(56) References Cited

U.S. PATENT DOCUMENTS 4,033,020 A 7/1977 Hudgens
9,452,444 B2 9/2016 Miyawaki
(Continued)

FOREIGN PATENT DOCUMENTS

CN 203996397 U 12/2014
DE 26 35 120 A 2/1977
(Continued)

OTHER PUBLICATIONS

English Translation of International Search Report issued in PCT/EP2018/077099, dated Jan. 18, 2019.

*Primary Examiner* — James D Sells
(74) *Attorney, Agent, or Firm* — thyssenkrupp North America, LLC

(57) ABSTRACT

A method for producing an axially movable connection between two tubular components with a plastic as a sliding material therebetween may involve providing the components to be joined where either at least one of the two components has a plastic coating or a plastic sleeve is provided between the components, joining the components to form a unit via a pressing force in an axial direction, clamping the unit in a device in which the components can be clamped and subjected to a displacement force in the axial direction, pressing a sonotrode against an outer of the two components, injecting an ultrasound signal into the sonotrode at a frequency close to the resonance frequency of one of the components, and moving the tubular components back and forth in the axial direction until the displacement force or the displacement velocity reaches a target, and ending the ultrasound signal.

10 Claims, 4 Drawing Sheets

(51) Int. Cl.
 *B29C 65/00* (2006.01)
 *B62D 1/185* (2006.01)
 *B29L 23/00* (2006.01)

(56) References Cited

U.S. PATENT DOCUMENTS

| | | |
|---|---|---|
| 2005/0087970 A1 | 4/2005 | Ulintz |
| 2010/0307280 A1 | 12/2010 | Schnitzer |
| 2011/0034256 A1 | 2/2011 | Tokioka |
| 2011/0219907 A1 | 9/2011 | Rietzler |
| 2014/0020502 A1 | 1/2014 | Schnitzer |
| 2014/0041194 A1 | 2/2014 | Sckurokawa |
| 2018/0251147 A1* | 9/2018 | Heitz .................. B62D 1/185 |
| 2019/0092370 A1 | 3/2019 | Breuer |
| 2019/0176871 A1 | 6/2019 | Breuer |

FOREIGN PATENT DOCUMENTS

| | | | |
|---|---|---|---|
| DE | 10063183 A | 6/2002 | |
| DE | 10 2004 051 670 A | 5/2005 | |
| DE | 10 2008 005 256 A | 8/2009 | |
| DE | 10 2008 049 825 A | 4/2010 | |
| DE | 102015216326 A | 6/2016 | |
| DE | 10 2016 203 627 B | 3/2017 | |
| DE | 10 2016 114 970 A | 2/2018 | |
| EP | 2281731 A | 2/2011 | |
| WO | 2009090018 A | 7/2009 | |
| WO | 2017032566 A | 3/2017 | |

* cited by examiner

METHOD FOR PRODUCING UNITS WITH AXIALLY MOVABLE COMPONENTS

CROSS REFERENCE TO RELATED APPLICATIONS

This application is a U.S. National Stage Entry of International Patent Application Serial Number PCT/EP2018/077099, filed Oct. 5, 2018, which claims priority to German Patent Application No. DE 10 2017 123 770.4, filed Oct. 12, 2017, the entire contents of both of which are incorporated herein by reference.

FIELD

The present disclosure generally relates to steering systems, including methods for producing motor vehicle steering systems with axially movable components.

BACKGROUND

Sliding connections for mutually movable components, especially tubular components such as coaxially telescopic tubes which are inserted telescopically in one another are used in various areas of technology. The sliding connection should generally be low-friction, free of play, and mechanically tough. Such telescopic connections are used in various places especially in motor vehicle steering systems. On the one hand, there is a telescopic combination of an inner and an outer casing tube in the steering column itself, which surround a steering shaft and are telescopic to allow the axial displacement of the steering column. Often a plastic sleeve is installed between the two mutually sliding components made of metal. The problem and the expense in the fabrication of these connections is that the plastic piece cannot be installed directly as a component and cannot meet the requirements of no play and a defined friction during the axial displacement movement without further processing steps.

In DE 10 2004 051 670 A1 a method is proposed for the making of a sliding connection of a steering column assembly in which a sleeve is provided between an outer casing tube and an inner casing tube, having a special configuration of ribs. A narrow tolerance field must be maintained here in order to produce good sliding ability, which causes high costs.

In DE 10 2008 005 256 B4 a sliding connection of a steering column is proposed in which a sleeve is provided between an inner tube and an outer tube, being provided with contact surfaces at local points by means of the application of heat, in order to produce a sliding connection free of play. This method is costly.

Thus a need exists for a method with which the process time can be shortened, less energy expense is required, and a better result can be achieved. A need also exists for a device with mutually sliding components in which a better freedom from play and a more precise maintaining of given frictional forces or sliding forces are present.

DETAILED DESCRIPTION

Figure 1:
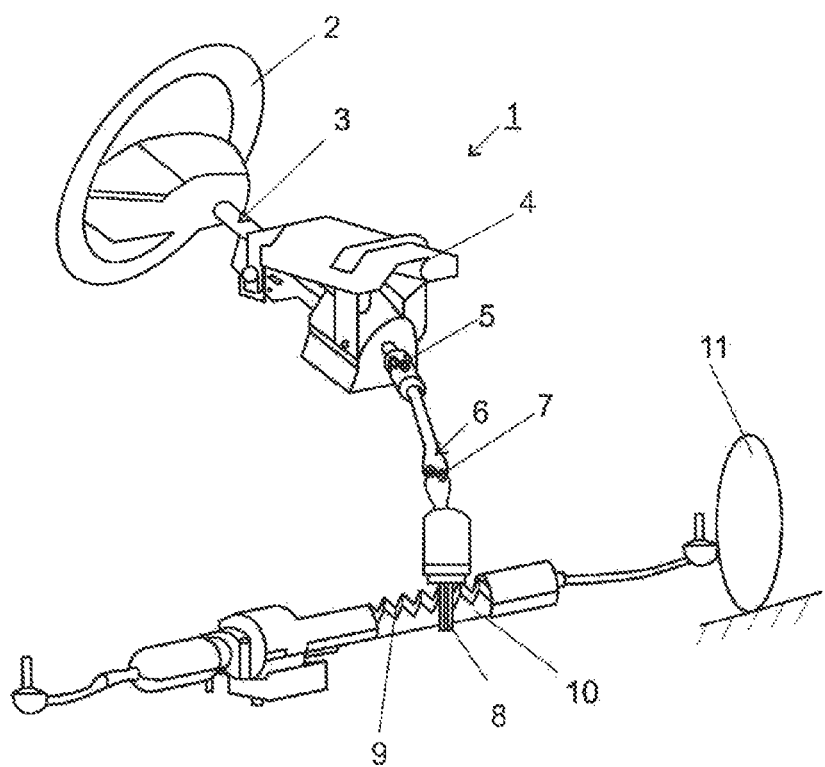
FIG. 1 is a schematic view of an example motor vehicle steering system.
Figure 2:
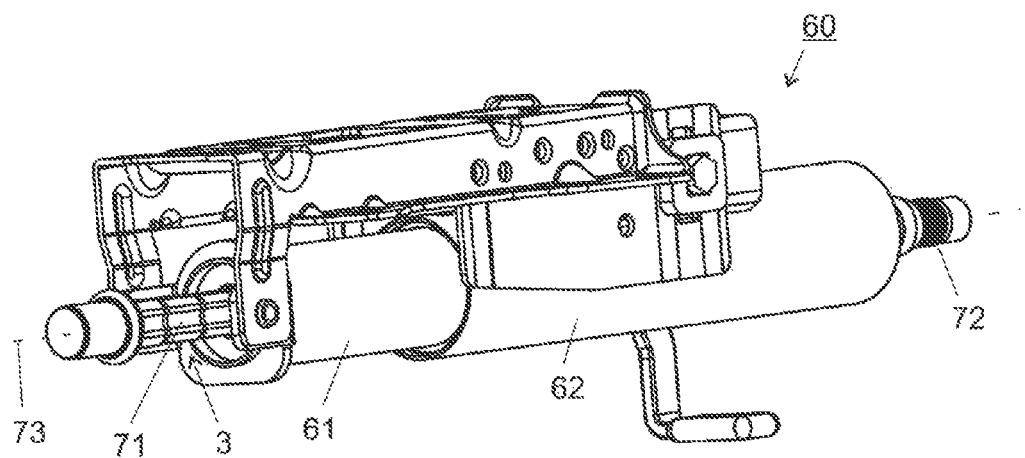
FIG. 2 is a perspective view of an example casing tube unit.
Figure 3:
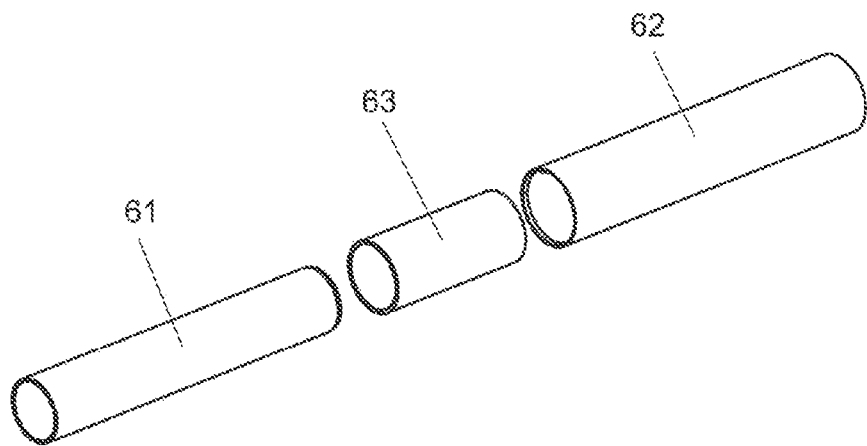
FIG. 3 is an exploded view of an example casing tube.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a method for producing an axially movable connection between two components, between which a plastic is arranged as a sliding material, may comprise:

a) providing the two tubular components to be joined, wherein either at least one of the two tubular components has a plastic coating on the surface facing toward the other tubular component or a plastic sleeve is provided between the tubular components, b) joining the tubular components to form a unit, optionally with the plastic sleeve, by means of a pressing force in the axial direction, c) clamping the unit in a device in which the two tubular components can be clamped and subjected to a displacement force in the axial direction, d) pressing a sonotrode from one side against the respectively outer tubular component and bracing the component against a counter-holder, e) injecting an ultrasound signal into the sonotrode at a frequency close to the resonance frequency of one of the components of the unit, and moving the tubular components back and forth in the axial direction until the displacement force or the displacement velocity reaches a desired target value, f) ending the ultrasound signal and removing the unit from the device.

This makes possible a faster and ultimately a more precise calibrating of the plastic sleeve or the sliding sleeve or the plastic coating in the displacement region of the components.

The components of the unit are in particular the outer tubular component or the inner tubular component or the plastic sleeve, if it is present as a separate component.

The problem of such an axially movable connection between two components, especially two cylindrical components, is to produce a displacement capability with the least possible displacement force and at the same time slight play between the components. In the designing of such a connection, a maximum permissible force needed to produce a displacement of the two components relative to each other is established. This force then constitutes the target value for the desired displacement force. It may also be provided to establish the target value for the desired displacement force at a value corresponding to 5%, preferably 10%, below the maximum permissible value for the displacement force that is established in the design.

The desired target value for the displacement velocity is determined by ascertaining in experiments the speed at which the desired target value for the displacement force is reached for a given displacement force lying above the maximum permissible displacement force. The target value for the speed is then established accordingly. Advantageously, an end stop can be provided at the target value of 5%, and more preferably 10%.

Preferably in the method an ultrasound signal is injected into the sonotrode with a frequency in the range of 20 to 35 kHz, the frequency here being as close as possible to a resonance frequency of one of the components, the inner tube or the outer tube, or the plastic sleeve, if present. The term "near the resonance frequency" should be understood in this regard. Deviations of +/−20% of the resonance frequency should be included in this term. Preferably, the distance between the frequency used and one of the resonance frequencies is less than +/−15%. More preferable are values which are closer than +/−10% to one of the resonance frequencies.

The energy transfer from the sonotrode to the plastic is then especially effective.

It may be provided that the resonance frequency is determined in a simulation prior to step a), so that this frequency can be saved in advance as a parameter for the actuating of the sonotrode.

It may be advantageous to vary the frequency of the ultrasound signal injected into the sonotrode during the course of the process.

Preferably, the components are an inner casing tube and an outer casing tube of an axially telescopic motor vehicle steering system.

If in step d) two sonotrodes are pressed against the outer component, a more intensive or otherwise parametrized energy injection is possible. In particular, the two sonotrodes can be injected with ultrasound signals of different frequencies.

Furthermore, it has been found that more than two sonotrodes may also be used with advantage in order to further increase the energy injection. A different frequency or a different frequency variation over the process time may be employed at each sonotrode. However, resonance frequencies of the inner casing tube and/or the outer casing tube are preferably actuable. The frequency variation can occur accordingly in frequency jumps or stages.

The ultrasound power may also be set separately for each sonotrode. Variations may also be provided. Thus, for a short starting time of up to 3 s, a high power can be provided, and then a low power for the rest of the process time. The low power is advantageously ⅓ lower than the high power.

To implement the method of producing the axially movable connection, the mutual displacement of the two components can be accomplished with a pneumatic cylinder. A force-guided movement of the clamped unit can be favourably accomplished by the injected pressure. The force can also be favourably adjusted for different speeds of movement and the displacement velocity can be measured.

In a motor vehicle steering system with a telescopic casing tube unit produced according to one of the methods described above, shorter possible cycle times and less energy expenditure are achieved in the fabrication process. Furthermore, the motor vehicle steering system as a result has better qualities in regard to robustness, freedom from play, and freedom from noise.

FIG. 1 shows in a schematic representation a motor vehicle steering system 1 having a steering wheel 2, which is rotationally fixed to an upper steering shaft 3. The upper steering shaft 3 is mounted in a bracket 4 in a height adjustable and axially movable manner. By a Cardan joint 5, the upper steering shaft 3 can swivel, but it is rotationally fixed to a lower steering shaft 6. The lower steering shaft 6, finally, is connected by a second Cardan joint 7 to a pinion 8, which engages with a rack segment 9 of a rack 10.

A rotary movement of the steering wheel 2 thus results in a displacement of the rack 10 and in known manner to a swiveling of steered wheels 11 of the motor vehicle, thereby producing a steering movement and a changing of the direction of travel.

Figure 4:
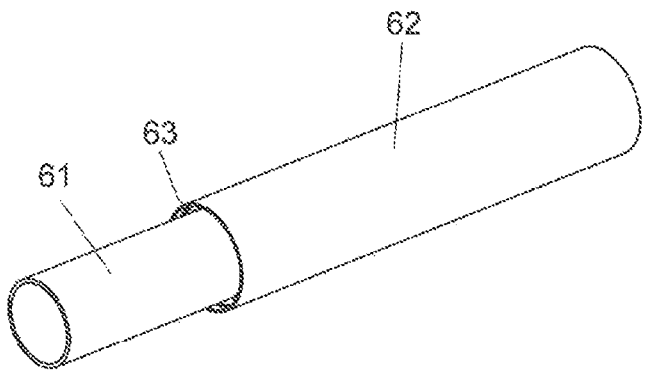
FIG. 4 is a perspective view of the casing tube.
Figure 5:
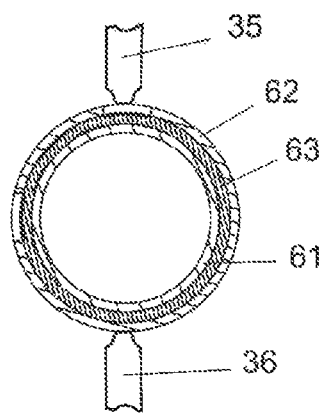
FIG. 5 is a cross-sectional view of the example casing tube of FIGS. 2-4.
Figure 6:
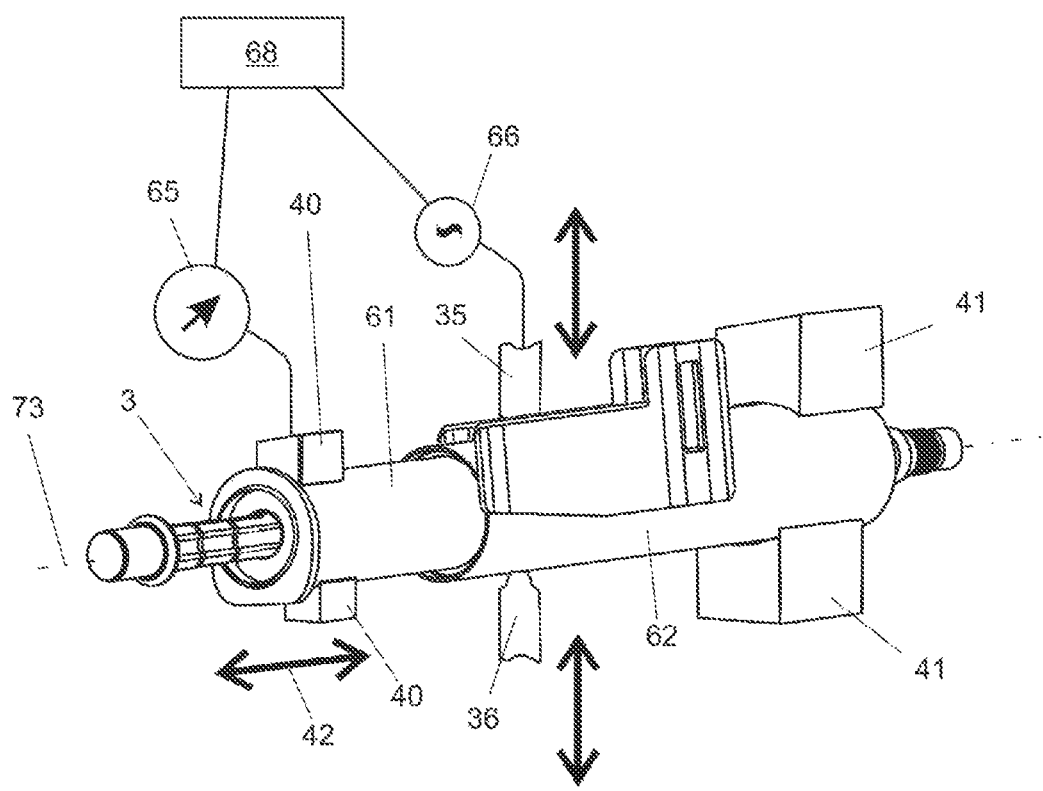
FIG. 6 is perspective view of the example casing tube of FIGS. 2-5 during calibration of the plastic sleeve.

FIGS. 2 to 5 show an example of a telescoping casing tube unit 60. The telescoping casing tube unit 60 comprises the upper steering shaft 3, which has been described above in FIG. 1. The upper steering shaft 3 is mounted rotatably about its longitudinal axis 73 in an inner casing tube 61 and an outer casing tube 62. For the axial displacement of the steering column, the inner casing tube 61 is adapted to be displaceable with respect to the outer casing tube 62 in the axial direction, corresponding to the longitudinal direction of the longitudinal axis 73. Between the inner casing tube 61 and the outer casing tube 62 there is provided a sliding sleeve 63, which is shown separately in FIG. 3. The sliding sleeve 63 sits between the inner casing tube 61 and the outer casing tube 62, as can be seen in FIGS. 4 and 5. The inner casing tube 61 and the outer casing tube 62 are not shafts in the technical sense, especially since they have a round circular cross section in the example depicted and cannot transmit any torques. Even so, it is advantageous for the seating of the two casing tube parts in the region of the sliding sleeve 63 to be free of play, yet smooth in movement. For this purpose, the method according to the invention is used for calibrating the sliding sleeve 63 between the inner casing tube 61 and the outer casing tube 62. This is illustrated in FIGS. 5 and 6. The sonotrode 35 is placed on the outside of the outer casing tube 62, which is braced against the oppositely placed anvil 36. The sonotrode 35 is then actuated by a control unit 66 with electrical voltage of a given frequency or frequency variation, corresponding to a resonance frequency of the outer casing tube 62. The vibrational energy, in turn, results in a heating of the sliding sleeve 63.

FIG. 6 illustrates how the inner casing tube 61 is clamped between clamping jaws 40 during the process, while the outer casing tube 62 is clamped between clamping jaws 41. While the sliding sleeve 63 is being heated, the inner casing tube 61 is moved back and forth in the direction of the double arrow 42. The displacement force F required for this is detected with a force sensor 65. The displacement force F decreases with the number of reciprocating movements in the direction of the double arrow 42. As soon as a given threshold value is reached or undershot, the calibrating of the sliding sleeve 63 is terminated. The process control occurs by a control and evaluation unit 68. The casing tube unit 60 so prepared is then removed from the clamping jaws 40 and 41, the anvil 36 and the sonotrode 35 are removed, and the casing tube can be installed in a bracket 4 according to FIG. 1.

Figure 7:
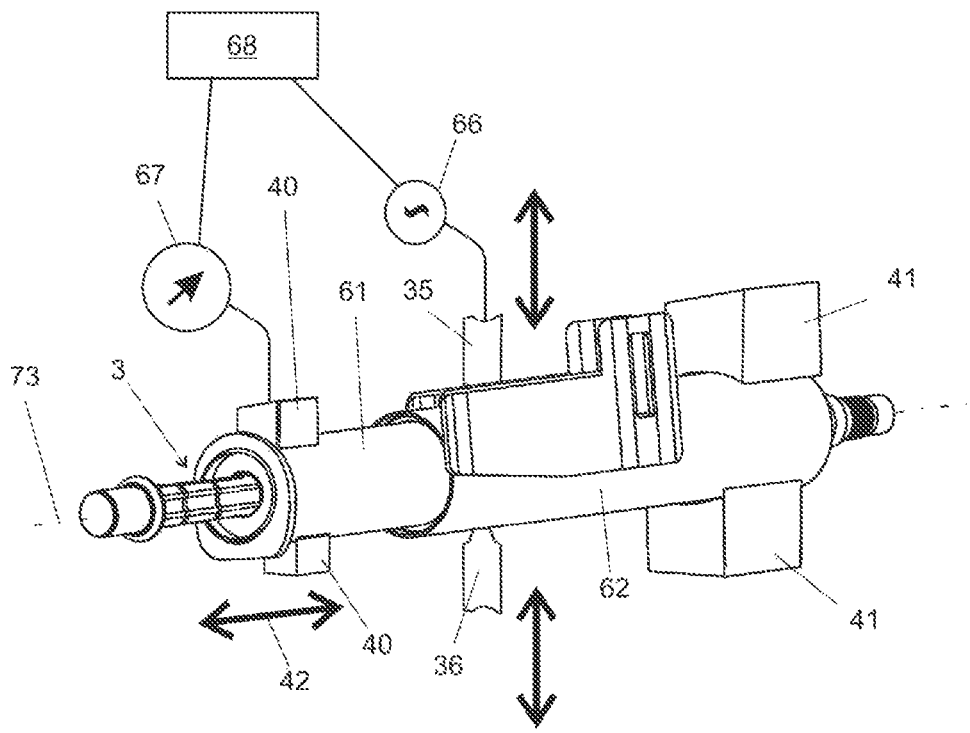
FIG. 7 is perspective view of the example casing tube of FIGS. 2-5 during a different calibration technique of the plastic sleeve.
Figure 8:
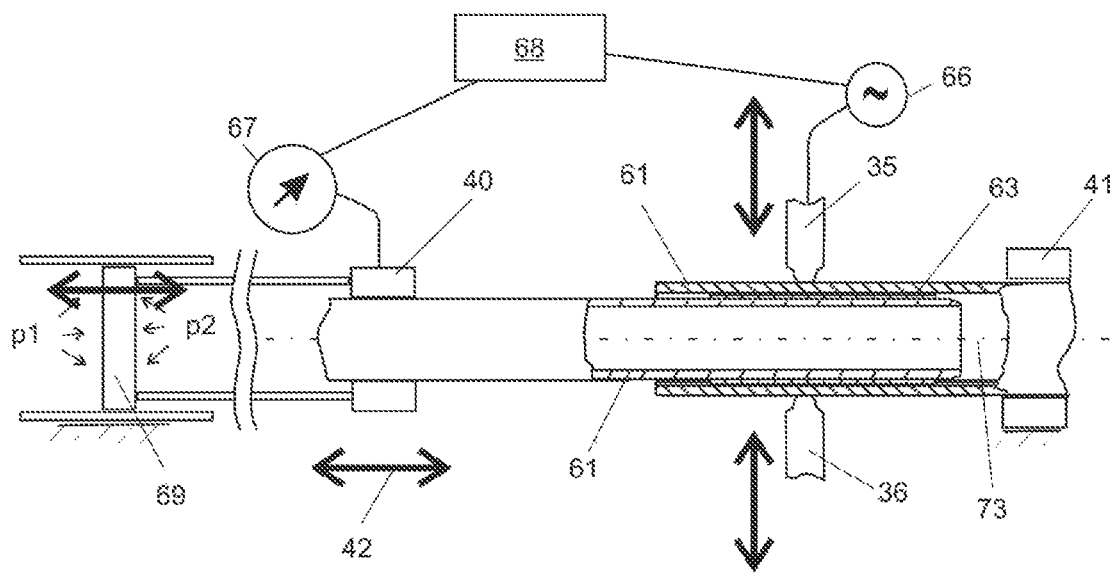
FIG. 8 is a longitudinal sectional view of the casing tube of FIG. 7 during calibration of the plastic sleeve.

FIGS. 7 and 8 illustrate an alternative process control. Alternatively or in combination with the use of a force sensor 65, a speed sensor 67 may be provided, which can also be designed as a displacement sensor, the speed being determined in a control and evaluation device 68. FIG. 8 illustrates the calibrating process in a longitudinal section. The sonotrode 35 and the anvil 36 are each placed on the surface of the outer casing tube 62. The inner casing tube 61 is inserted in the plastic sleeve 63 and the outer casing tube 62. The two casing tubes are now grasped by clamping jaws 40 and 41. The clamping jaw 41 is held stationary, while the clamping jaw 40 can be subjected to movement by a piston 69 of a pneumatic cylinder. A control and evaluation unit 68 undertakes the process control. The sonotrode 35 is actuated by a control unit 66 in order to transmit an ultrasound vibration to the outer casing tube 62. In this way, the outer casing tube 62 is placed in a mechanical vibration. Since the outer casing tube 62 itself vibrates relatively freely, the vibrational energy is transmitted in large measure to the plastic sleeve 63, which is thereby deformed with high frequency. The plastic sleeve 63 becomes heated in this process. At the same time, the inner casing tube 61 is moved back and forth in the axial direction by a relative movement in the direction of the double arrow 42 by means of the clamping jaws 40 and 41. For this, the pressures p1 and p2 are alternately increased and decreased, so that the piston 69 is moved back and forth. The piston 69 is accordingly coupled mechanically to the clamping jaw 40. The heated plastic sleeve 63 becomes adapted to the two mutually facing surfaces of the inner casing tube 61 and of the outer casing tube 62. The adapting process can be monitored by detecting the speed with which the clamping jaw 40 is moved by means of a distance sensor or a speed sensor 67. Preferably, the heating of the plastic sleeve 30 by means of ultrasound and the movement in the direction of the double arrow 42 is continued until such time as the maximum value of the displacement velocity exceeds a given minimum target value. The adapting process is then finished.

After switching off the excitation of the sonotrode 35, the plastic sleeve 63 cools down quickly, since the two casing tube pieces 61 and 62 themselves were essentially not heated by the ultrasound excitation and hence they are cold compared to the plastic sleeve 63. This promotes the dimensional stability of the plastic sleeve 63 so calibrated. What is more, the outer casing tube 62 and the inner casing tube part 61 undergo practically no thermal changes in their dimensions during this process. This improves the achievable precision of the calibrating process of the plastic sleeve 63.

The heating and cooling times of the described process are short, on account of the slight mass of the plastic sleeve 63 to be heated, so that a short cycle time can be achieved. Furthermore, it is enough to heat the plastic sleeve only at the surface, to the point that it can be easily molded. The sequence of the above-described processes thus provides the following partly optional process steps as an exemplary embodiment:

providing the two tubular components to be joined, wherein
either at least one of the two tubular components has a plastic coating on the surface facing toward the other shaft component,
or a plastic sleeve is provided for butting between the tubular components,
joining the tubular components, optionally with the plastic sleeve in between,
wherein the tubular components and optionally the plastic sleeve are configured such that the joining can occur only by overcoming a pressing force, since the sliding fit is designed with an oversize,
clamping the unit in a device in which the two tubular components can be clamped and subjected to a displacement force in the axial direction. The device is preferably outfitted such that a displacement force can be measured.
pressing a sonotrode from one side against the respectively outer shaft component and bracing the inner component against a counter-holder (anvil),
injecting an ultrasound signal into the sonotrode and moving the tubular components back and forth in the axial direction until the displacement force reaches a desired target value. Alternatively, the method can be executed such that the tubular components are moved relative to each other with a constant force and the displacement velocity is measured. The process is then ended when a particular displacement velocity is achieved.
After the end of the process, the shaft is removed from the device as a finished component and is installed elsewhere.

What is claimed is:

1. A method for producing an axially movable connection between two tubular components, between which two tubular components a plastic is disposed as a sliding material, the method comprising:
providing the two tubular components to be joined, wherein either
at least one of the two tubular components has a plastic coating on a surface facing the other tubular component, or
a plastic sleeve is disposed between the two tubular components;
joining the two tubular components to form a unit by a pressing force in an axial direction;
clamping the unit in a device in which the two tubular components are clampable and subjectable to a displacement force in the axial direction;
pressing a sonotrode from one side against an outer of the two tubular components and bracing the outer of the two tubular components against a counter-holder;
injecting an ultrasound signal into the sonotrode at a frequency close to a resonance frequency of one of the two tubular components and moving the two tubular components back and forth in the axial direction until a displacement force or a displacement velocity reaches a target value; and
ending the ultrasound signal and removing the unit from the device.

2. The method of claim 1 wherein the frequency lies in a range of 20 to 35 kHz.

3. The method of claim 1 comprising varying the frequency of the ultrasound signal while the ultrasound signal is injected into the sonotrode.

4. The method of claim 1 comprising determining the resonance frequency in a simulation prior to providing the two tubular components.

5. The method of claim 1 wherein the two tubular components comprise an inner casing tube and an outer casing tube of an axially telescopic motor vehicle steering system.

6. The method of claim 1 wherein the sonotrode is a first sonotrode, the method comprising pressing the first sonotrode and a second sonotrode against the outer of the two tubular components.

7. The method of claim 6 comprising injecting the first and second sonotrodes with ultrasound signals of different frequencies.

8. The method of claim 1 wherein the frequency is within 15% of the resonance frequency.

9. The method of claim 1 wherein the frequency is within 10% of the resonance frequency.

10. A motor vehicle steering system having a telescopic casing tube unit that is produced by the method of claim 1.

* * * * *